(12) United States Patent
Tabor

(10) Patent No.: US 9,128,008 B2
(45) Date of Patent: Sep. 8, 2015

(54) ACTUATOR PREDICTIVE SYSTEM

(71) Applicant: Kent Tabor, Pewaukee, WI (US)

(72) Inventor: Kent Tabor, Pewaukee, WI (US)

(*) Notice: Subject to any disclaimer, the term of this patent is extended or adjusted under 35 U.S.C. 154(b) by 368 days.

(21) Appl. No.: 13/838,253

(22) Filed: Mar. 15, 2013

(65) Prior Publication Data

US 2013/0276516 A1    Oct. 24, 2013

Related U.S. Application Data

(60) Provisional application No. 61/636,431, filed on Apr. 20, 2012.

(51) Int. Cl.
*G01M 99/00* (2011.01)
*F15B 19/00* (2006.01)
*G01M 3/28* (2006.01)
*F15B 15/28* (2006.01)

(52) U.S. Cl.
CPC ............ *G01M 99/008* (2013.01); *F15B 19/005* (2013.01); *F15B 15/2861* (2013.01); *F15B 2211/6306* (2013.01); *F15B 2211/6313* (2013.01); *F15B 2211/6336* (2013.01); *F15B 2211/6343* (2013.01); *F15B 2211/6656* (2013.01); *F15B 2211/7053* (2013.01); *F15B 2211/857* (2013.01); *F15B 2211/864* (2013.01); *F15B 2211/865* (2013.01); *F15B 2211/87* (2013.01); *G01M 3/2869* (2013.01)

(58) Field of Classification Search
CPC ....... G01M 3/26; G01M 3/28; G01M 3/2853; G01M 3/2869; G01M 99/0008; F15B 19/005
USPC .......................................................... 73/47
See application file for complete search history.

(56) References Cited

U.S. PATENT DOCUMENTS 3,362,215 A * 1/1968 Weinstock .................. 73/47
4,571,994 A   2/1986 Dickey
(Continued)

FOREIGN PATENT DOCUMENTS

CN    201034909      3/2008
EP      0092123    10/1983
(Continued)

OTHER PUBLICATIONS

PCT/US2013/037393 International Search Report and Written Opinion dated Jul. 25, 2013 (9 pages).

*Primary Examiner* — Peter Macchiarolo
*Assistant Examiner* — Nathaniel Kolb
(74) *Attorney, Agent, or Firm* — Michael Best & Friedrich LLP

(57) ABSTRACT

An actuator system includes a piston-cylinder arrangement including a piston that is movable with respect to a cylinder. A first flow path is in fluid communication with the piston-cylinder arrangement and a second flow path is in fluid communication with the piston-cylinder arrangement. A control system is operable to fluidly connect the first flow path to a source of high-pressure fluid and to connect the second flow path to a drain to move the piston in a first direction. A pressure sensor is fluidly connected to the first flow path and is operable to measure sufficient pressure data during the movement of the piston to generate a pressure versus time curve. The control system is operable to compare the generated pressure versus time curve to a known standard pressure versus time curve stored in the control system to determine the condition of the piston-cylinder arrangement.

17 Claims, 13 Drawing Sheets

(56) References Cited

U.S. PATENT DOCUMENTS

| | | | |
|---|---|---|---|
| 4,719,792 A * | 1/1988 | Eriksson | 73/47 |
| 5,471,400 A * | 11/1995 | Smalley et al. | 702/51 |
| 5,563,351 A | 10/1996 | Miller | |
| 5,566,091 A | 10/1996 | Schricker et al. | |
| 5,628,229 A | 5/1997 | Krone et al. | |
| 6,708,507 B1 | 3/2004 | Sem et al. | |
| 6,763,703 B2 * | 7/2004 | Krieger et al. | 73/49.8 |
| 7,082,758 B2 * | 8/2006 | Kageyama et al. | 60/445 |
| 7,120,523 B2 * | 10/2006 | Muller | 701/31.4 |
| 7,124,057 B2 | 10/2006 | Förster et al. | |
| 7,204,138 B2 * | 4/2007 | Du | 73/168 |
| 7,542,875 B2 | 6/2009 | Rogers | |
| 2004/0158419 A1 * | 8/2004 | Pearson et al. | 702/64 |

FOREIGN PATENT DOCUMENTS

| | | |
|---|---|---|
| JP | 2220705 | 9/1990 |
| JP | 07-76036 | 3/1995 |
| JP | 07076036 | 3/1995 |
| JP | 2002-297237 | 10/2002 |
| JP | 2002297237 | 10/2002 |
| JP | 2004-205022 | 7/2004 |
| JP | 2004205022 | 7/2004 |
| KR | 100721101 | 5/2007 |

* cited by examiner

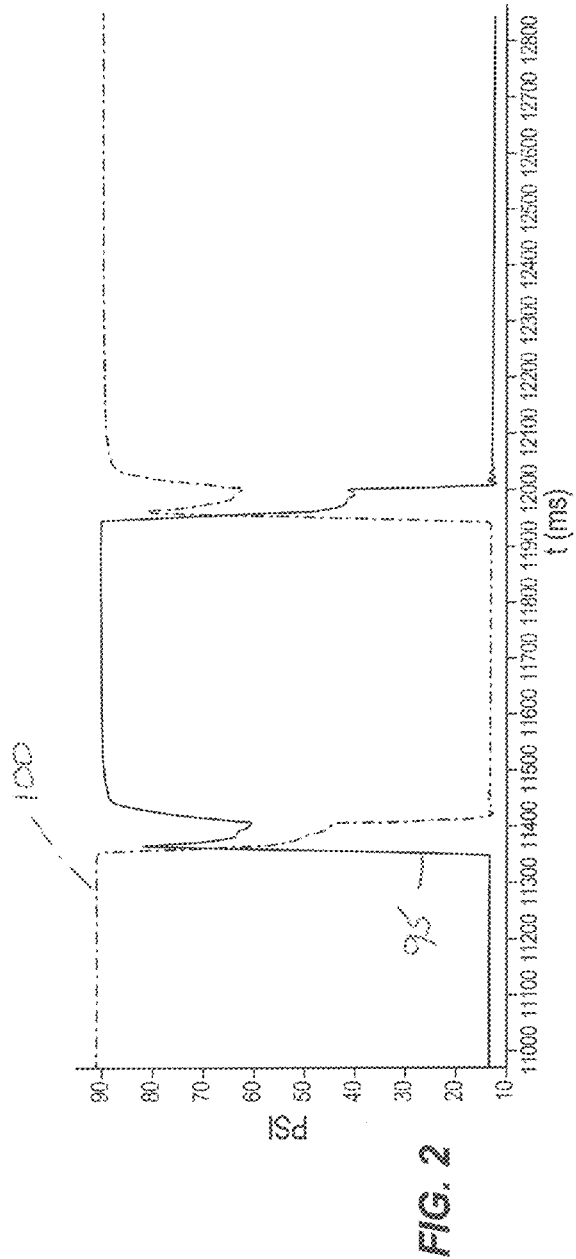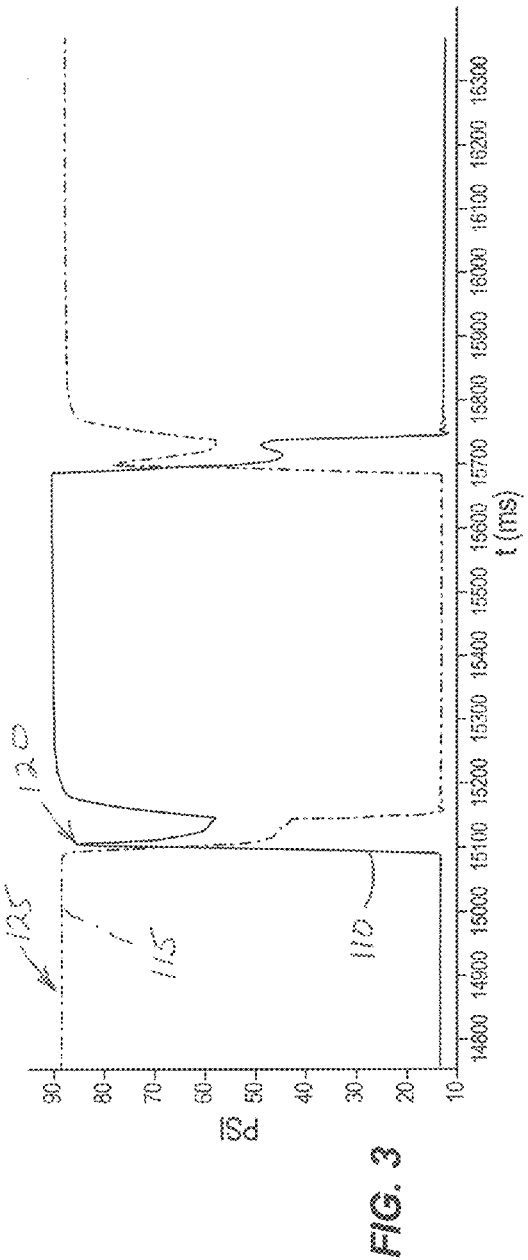
FIG. 2
FIG. 3

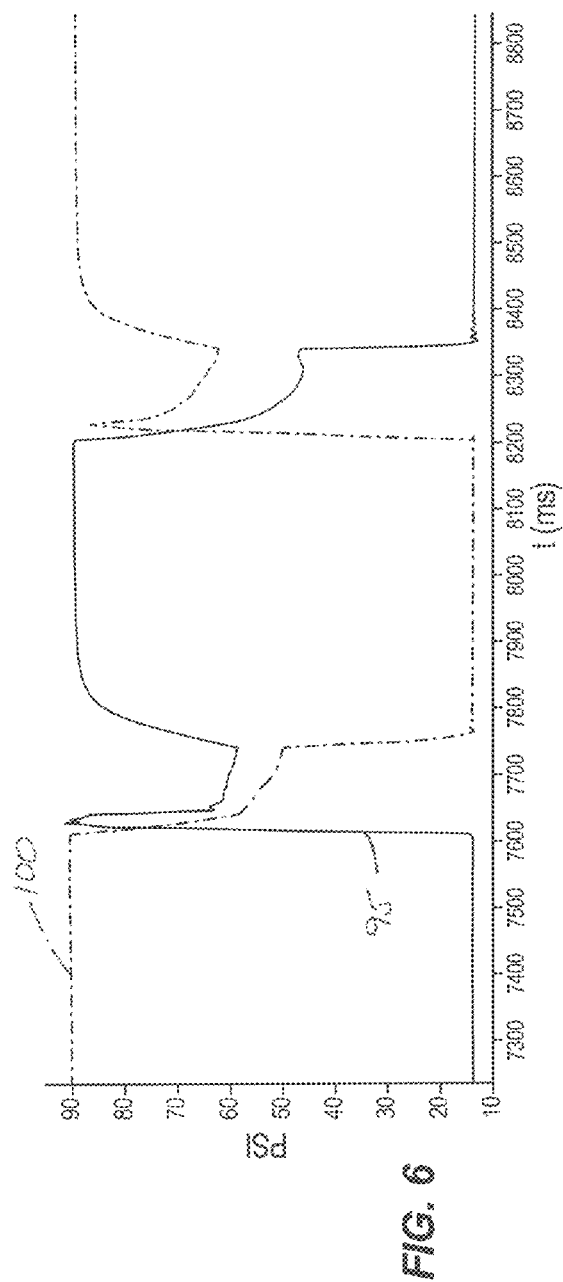
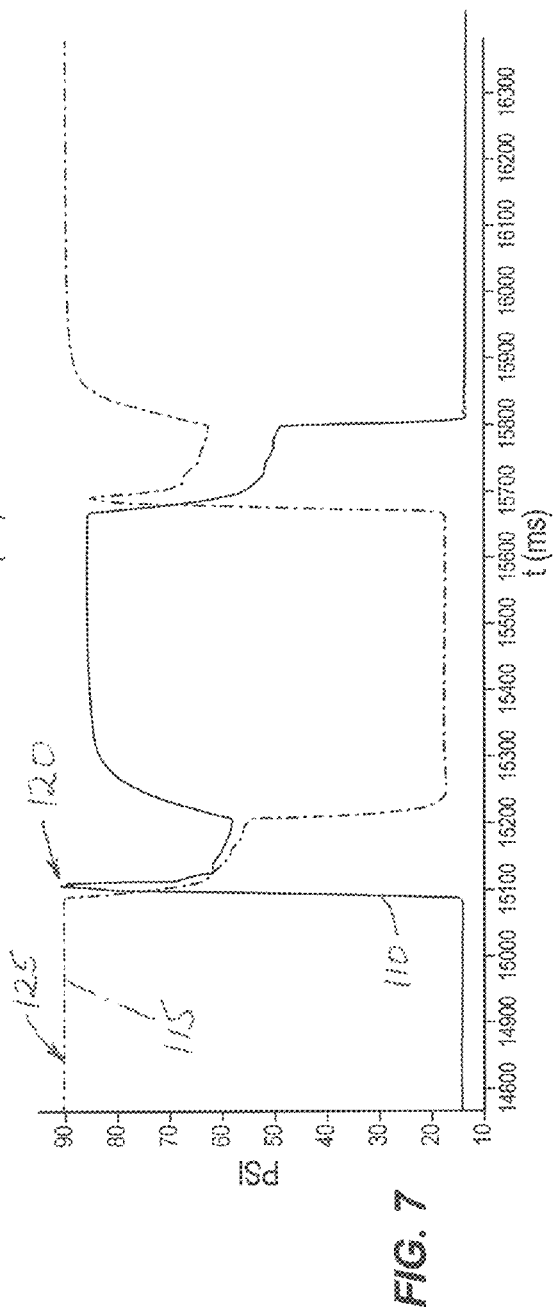
FIG. 6
FIG. 7

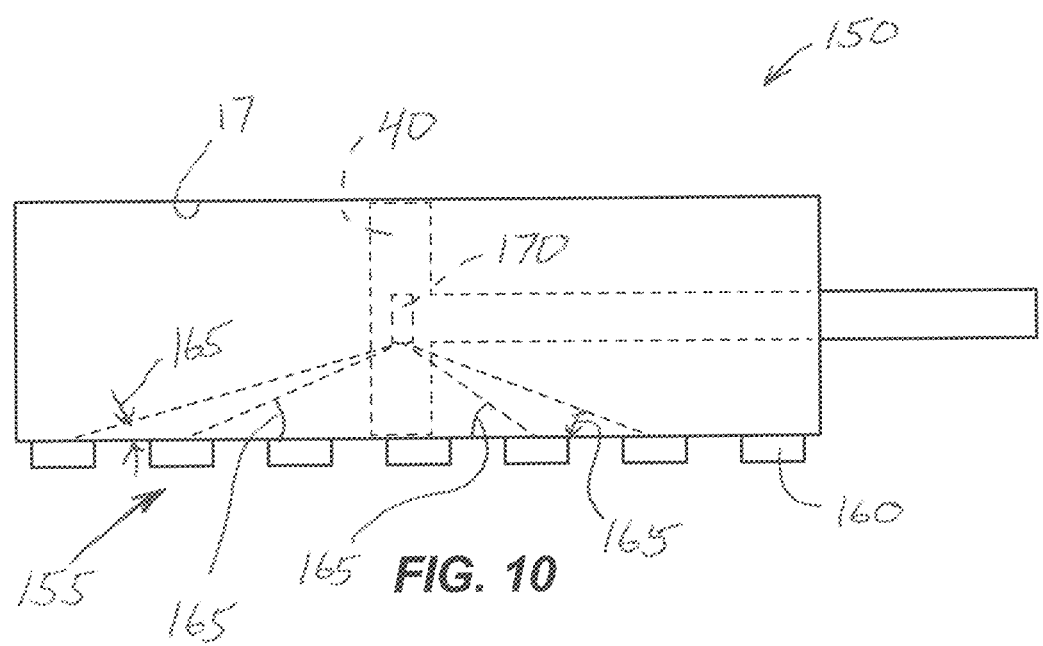

ACTUATOR PREDICTIVE SYSTEM

RELATED APPLICATION DATA

This application claims priority to U.S. Provisional Application No. 61/636,431 filed Apr. 20, 2012, the entire contents of which are incorporated herein by reference.

BACKGROUND

The present invention relates to system and method for predicting the condition of a cylinder. More specifically, the invention relates to a system and method that uses pressure or another parameter to determine the condition of a pneumatic or hydraulic cylinder.

Pneumatic and hydraulic cylinders are used throughout industry to operate equipment in manufacturing lines and to provide a motive force for various components. Over time, the operation of these cylinders can degrade. However, often, the degradation in performance is not detected until an ultimate failure of the cylinder occurs. If a user is unprepared for the failure, it can result in substantial down time or costs.

SUMMARY

In one embodiment, the invention provides a system that uses one or more pressure sensors to monitor the condition of a cylinder. The system includes a microprocessor/controller that compares measured pressure data to a known baseline for a particular cylinder performing a known function to determine if the operation is acceptable. The system can be standalone or part of a distributed control system. In some constructions, the system can include position sensors that detect the actual position of a piston within the cylinder.

In another construction, the invention provides an actuator system that includes a piston-cylinder arrangement including a piston that is movable with respect to a cylinder. A first flow path is in fluid communication with the piston-cylinder arrangement and a second flow path is in fluid communication with the piston-cylinder arrangement. A control system is operable to fluidly connect the first flow path to a source of high-pressure fluid and to connect the second flow path to a drain to move the piston in a first direction. A pressure sensor is fluidly connected to the first flow path and is operable to measure sufficient pressure data during the movement of the piston to generate a pressure versus time curve. The control system is operable to compare the generated pressure versus time curve to a known standard pressure versus time curve stored in the control system to determine the condition of the piston-cylinder arrangement.

In another construction, the invention provides an actuator system that includes a cylinder defining an internal space and including a first fluid port disposed adjacent a first end of the space and a second fluid port adjacent the second end of the space. A piston is disposed within the internal space and is operable to divide the space into a first side and a second side, the first side in fluid communication with the first fluid port and the second side in fluid communication with the second fluid port. A working member is coupled to the piston and is operable to perform work in response to movement of the piston and a control system is operable to selectively fluidly connect the first fluid port to one of a pressure source and a drain and to connect the second fluid port to the other of the drain and the pressure source to selectively move the piston away from the first port and toward the first port. A pressure sensor is in fluid communication with the first side and is operable to measure pressure data during movement of the piston. The control system is operable to compare the measured pressure data to a known standard to determine the condition of the system.

In yet another construction, the invention provides a method of predicting a failure in an actuator system. The method includes porting a high-pressure fluid to a first side of a piston-cylinder arrangement, draining a low-pressure fluid from a second side of the piston-cylinder arrangement to allow the piston to move with respect to the cylinder toward the second side, and taking a plurality of pressure measurements of the fluid adjacent the first side during the movement of the piston. The method also includes comparing the plurality of pressure measurements to a known set of pressure values and determining if a failure is likely based on the comparison of the plurality of pressure measurements to the known set of pressure values.

Other aspects of the invention will become apparent by consideration of the detailed description and accompanying drawings.

BRIEF DESCRIPTION OF THE DRAWINGS

FIG. 2 is a plot illustrating measured pressure values versus time for a new actuator in the horizontal position with no load and no damping;

FIG. 3 is a plot illustrating measured pressure values versus time for a actuator in the same arrangement as that of FIG. 2, wherein the actuator is known to be damaged;

FIG. 6 is a plot illustrating measured pressure values versus time for a new actuator that has a larger diameter than the actuator of FIGS. 2-5 arranged in the horizontal position with no load but with damping;

FIG. 7 is a plot illustrating measured pressure values versus time for a actuator in the same arrangement as that of FIG. 6, wherein the actuator is known to be damaged;

FIG. 10 is a schematic illustration of the arrangement of FIG. 1 and further including a position measurement system;

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways.

Figure 1:
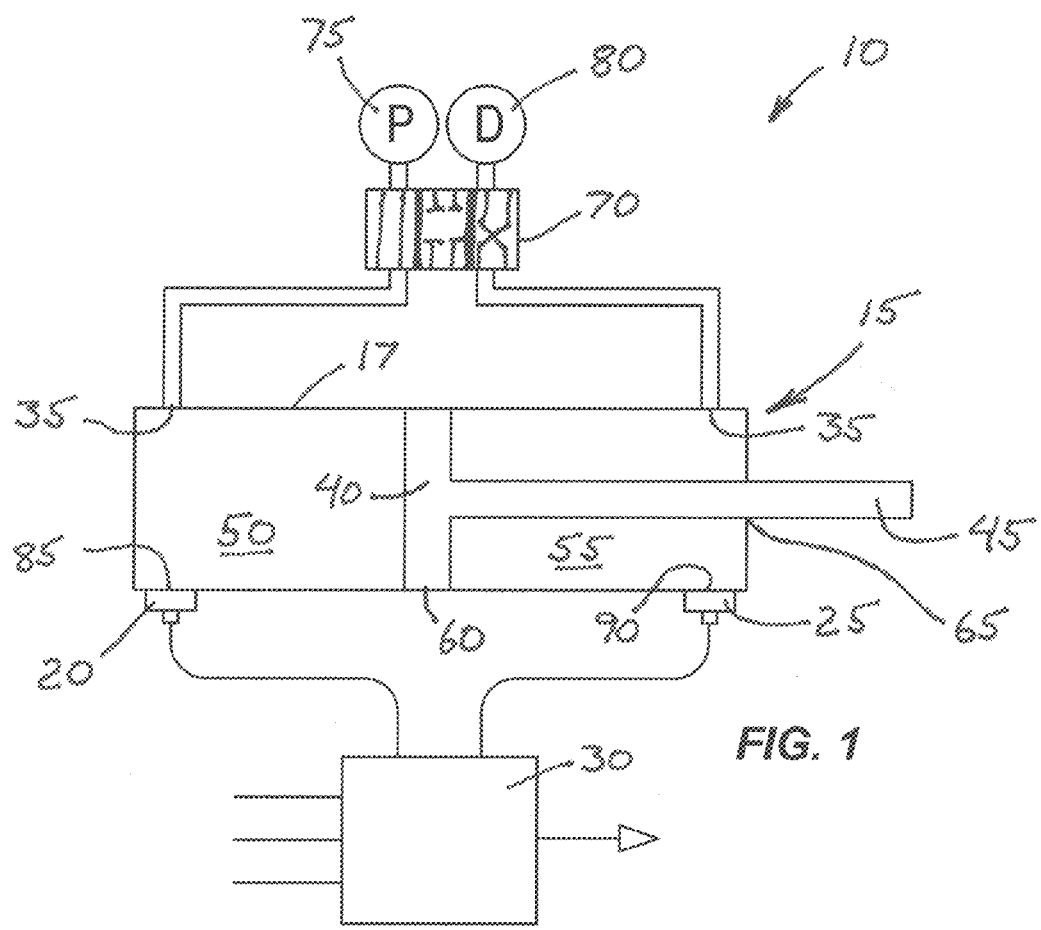
FIG. 1 is a schematic illustration of one possible arrangement of a system embodying the invention.

FIG. 1 illustrates a system 10 that is suitable for use in predicting or evaluating the condition of an actuator 15 (e.g., pneumatic, hydraulic, etc.) or valve. The system 10 includes a cylinder 17, a first pressure sensor 20, a second pressure sensor 25, and a microprocessor 30. The illustrated actuator 15 is a typical double acting actuator 15 having a port 35 at either end of a cylinder 17, a piston 40 disposed between the ports 35 and a rod 45 extending from the piston 40 and out one end of the cylinder 17. The piston 40 divides the cylinder 17 into a first chamber 50 and a second chamber 55. Each of the chambers 50, 55 provides a variable volume that allows for movement of the piston 40. As one of ordinary skill in the art will realize, the system 10 described herein can be applied to different types of actuators (e.g., rodless) and can be used with actuators powered with different working fluids (e.g., hydraulic fluid, oils, water, fuel, air, other gases, other liquids, etc.). In addition, while the illustrated actuator is not biased in any direction, this system could be applied to spring return actuators as well. In fact, the actual design of the actuator or valve is largely irrelevant as the invention can be adapted to many designs.

The working fluid is admitted into one port 35 and allowed to drain or escape from the other port 35 to move the piston 40 and rod 45 away from the port 35 in which fluid is being admitted. Because a large pressure differential exists during movement of the piston 40, a seal 60 is provided between the piston 40 and the cylinder 17. After some amount of use, this seal 60 can wear or otherwise degrade creating one point where failure may occur. A second seal 65 is provided at the end of the cylinder 17 through which the rod 45 extends. This second seal 65 reduces the amount of working fluid that escapes at the rod opening. Through use, this seal 65 can wear or otherwise degrade creating a second point of possible failure.

Typically, one or more valves 70 are used to direct the working fluid to and from the ports 35 as required to produce the desired movement. In a preferred arrangement, a three-way valve 70 allows the first port 35 to be open to a pressure supply 75 and the second port 35 to be opened to a drain 80 in a first position. In a second position, the ports 35 are reversed so that the first port 35 is open to the drain 80 and the second port 35 is open to the pressure supply 75. The first position and the second position produce movement of the piston 40 and rod 45 in opposite directions. The valve 70 also provides a third operating position in which both ports 35 are closed, thereby trapping the working fluid on both sides of the piston 40. The third position allows the piston 40 and rod 45 to be positioned and held at some point intermediate of the two extremes. In addition, variable flow rate valves or other flow control devices can be employed to control the rate of fluid flow into or out of the ports 35 to control the speed, acceleration, and exact position of the piston 40 and rod 45 as it moves.

With continued reference to FIG. 1, the first pressure sensor 20 is positioned to measure a pressure within the first chamber 50 and the second sensor 25 is positioned to measure a pressure within the second chamber 55. In the illustrated construction, the first sensor 20 is positioned within a first sensor port 85 that is spaced apart from the fluid port 35 already provided in the first chamber 50 of the cylinder 17. Similarly, the second sensor 25 is positioned within a second sensor port 90 that is spaced apart from the fluid port 35 already provided in the second chamber 55 of the cylinder 17. In other constructions, the pressure sensor 25 might be connected in line with the fluid lines that connect to the cylinder 17 and the valve 70 or may be connected to a tap line that extends from the feed line or the cylinder chambers 50, 55 as may be desired.

The pressure sensors 20, 25 preferably have a range of sensed pressures that exceeds 150 psi with an accuracy of about 0.01 psi with more or less accurate sensors also being possible. Of course, sensors operating at 250 psi or higher are also possible. Additionally, the sensor 20, 25 is preferably sized to provide a response time that allows for data acquisition at a rate of about 1000 data points per second. Of course other pressure sensors could be employed if desired. For example, in one construction, sound pressure sensors, audio sensors, or other vibration sensors are employed to measure the desired operating characteristics of the actuator 15.

In preferred constructions, the pressure sensors 20, 25 are removably connected to the actuator 15 so that they may be reused with subsequent actuators 15. Alternatively, the pressure sensors 20, 25 can be manufactured as part of the actuator 15 and replaced with the actuator 15.

The pressure sensors 20, 25 convert the measured pressures within their respective chambers into a pressure signal that is transmitted to the microprocessor/controller 30. In preferred constructions, the microprocessor/controller 30 is dedicated to capture data, stream data and/or analyze for faults or control values. Also, a data logger function can be provided to capture the number of operating cycles, minimum and maximum temperatures, maximum pressures, etc. Each microprocessor/controller 30 can include a unique ID. In the construction illustrated in FIG. 1, a wired connection is illustrated. However, wireless connections such as infra-red, radio frequency and the like are also possible. The microprocessor/control 30 receives the pressure signals and compares the signals to known signals for actuators 15 to make decisions regarding the performance and condition of the actuator 15 to which it is connected. The microprocessor/controller 30 may include indicators such as lights or audio devices that can be actuated when a particular condition is detected. For example, a red light could be provided and illuminated when excessive wear or damage to the actuator 15 is detected. The microprocessor/controller 30 may have additional inputs (e.g., ambient temperature, pressure, control signals, etc.) and is provided with multiple output options (e.g., Ethernet, RS-485/422, RS-232, USB, RF, IR, LED blink code, etc.). As noted the microprocessor/controller 30 can perform the necessary comparisons and make decisions regarding the operation, maintenance, or condition of the actuator 15 or can transfer the raw data or decision information to a central computer that then displays the information for one or more actuators 15 to a user. Additionally, the microprocessor/controller can perform data logging functions and store data relating to virtually any measured parameter such as but not limited to the number of cycles, maximum and minimum pressures or temperatures, number of faults, etc.

In operation, the present system 10 can be applied to virtually any actuator 15 performing any operation. However, as one of ordinary skill in the art will realize, the performance of any given actuator 15 will vary with the load applied, the positioning of the actuator 15 and the load, the size of the actuator 15, the distance from the pressure source 75, and any number of other variables. As such, the preferred approach is to measure the performance of a known actuator 15 in the particular application and use that measured data as a baseline. The baseline represents an acceptable motion profile and is compared to the measured profiles by the microprocessor/controller 30. This comparison is then used to determine fault condition and reporting.

FIG. 2 illustrates an example of one such baseline measurement that is exemplary and includes pressure measured and plotted versus time. As can be seen, the pressure varied between about 10 psi and 95 psi with other pressure ranges being possible. In addition, the entire stroke of the piston 40 in a first direction takes about 100 ms with faster or slower strokes being possible. In addition, the stroke in one direction can be faster than the stroke in the opposite direction due to the reduced piston area caused by the rod 45.

With continued reference to FIG. 2, there are two curves 95, 100 where each curve 95, 100 represents data from one of the pressure sensors 20, 25. The first pressure sensor 20 is measuring a pressure of slightly more than 10 psi and is therefore connected to the drain 80. The second pressure sensor 25 is measuring slightly above 90 psi and is connected to the high pressure source 75. Thus, the piston 40 is displaced to an extreme end nearest the first pressure sensor 20. At a first time, the control valve 70 is moved to the second position such that the first chamber 50 and therefore the first pressure sensor 20 are exposed to the high pressure fluid 75 and the second chamber 55 and therefore the second pressure sensor 25 are opened to the drain 80. The pressure within the second chamber 55 immediately begins to drop, following a substantially exponential curve. Simultaneously, the pressure within the first chamber 50 rises substantially linearly to a first pressure level. Upon reaching the first pressure level, the force produced by the high pressure fluid on the piston 40 overcomes the piston's mechanical inertia and any sticking friction and the piston 40 begins to move toward the second pressure sensor 25. The movement of the piston 40 increases the volume in the first chamber 50, thereby causing a drop in pressure to a level below the first pressure. Simultaneously, the volume within the second chamber 55 is reduced and the pressure drops toward a lower level at an accelerated rate. Once the piston 40 reaches its end of travel, the pressure within the first chamber 50 increases to a level about equal to the pressure of the high pressure source 75 and the pressure within the second chamber 55 drops to a level about equal to the drain pressure 80.

As illustrated in FIG. 2, movement in the opposite direction produces similar curves with slightly different pressure values and durations. The variations in the pressures and the durations are mainly due to the non-symmetric configuration of the chambers 50, 55. For example, the first pressure required to overcome inertia and sticking friction is lower in the one direction of FIG. 2 because the piston area is slightly larger due to the omission of the rod 45 on the second chamber side of the piston 40. The total force on the piston 40 is about the same in both directions. Of course, if a load is applied, this relationship and the values will change based at least in part on that load.

FIG. 3 illustrates the same type of actuator 15 performing the same operation as the actuator 15 of FIG. 2. However, the actuator 15 of FIG. 3 is known to be defective. A comparison of the curves 110, 115 of FIG. 3 that correspond with the curves 95, 100 of FIG. 2 illustrates several differences. For example, the magnitude 120 of the first pressure required to initiate movement of the piston 40 is noticeably higher in FIG. 3 than it is in FIG. 2. In addition, once piston movement begins, the pressure within the first chamber 50 drops more significantly than it does with the actuator 15 of FIG. 2. Thus, the pressure variation within the first chamber 50 during piston motion is larger with the damaged actuator 15 of FIG. 3 when compared to the good actuator 15 of FIG. 2.

The curve representing the data measured by the opposite pressure sensor is also different between FIG. 2 and FIG. 3. For example, the high pressure value 125 that is maintained prior to moving the valve 70 is lower in FIG. 3 than it is in FIG. 2. In addition, when opened to the drain, the pressure within the second chamber 55 drops faster in the cylinder of FIG. 3 when compared to the cylinder of FIG. 2.

The differences between the two curves 110, 115 can also be illustrative of possible problems with the cylinder. For example, the difference between the maximum pressure within the second chamber 55 prior to switching the valve 70 and the first pressure required to initiate movement 120 of the piston 40 is significantly different between FIG. 2 and FIG. 3. Additionally, the pressure difference between the two chambers 50, 55 during motion of the piston 40 and at the end of the piston's stroke is much smaller for the actuator 15 of FIG. 3 when compared to the actuator 15 of FIG. 2.

Figure 4:
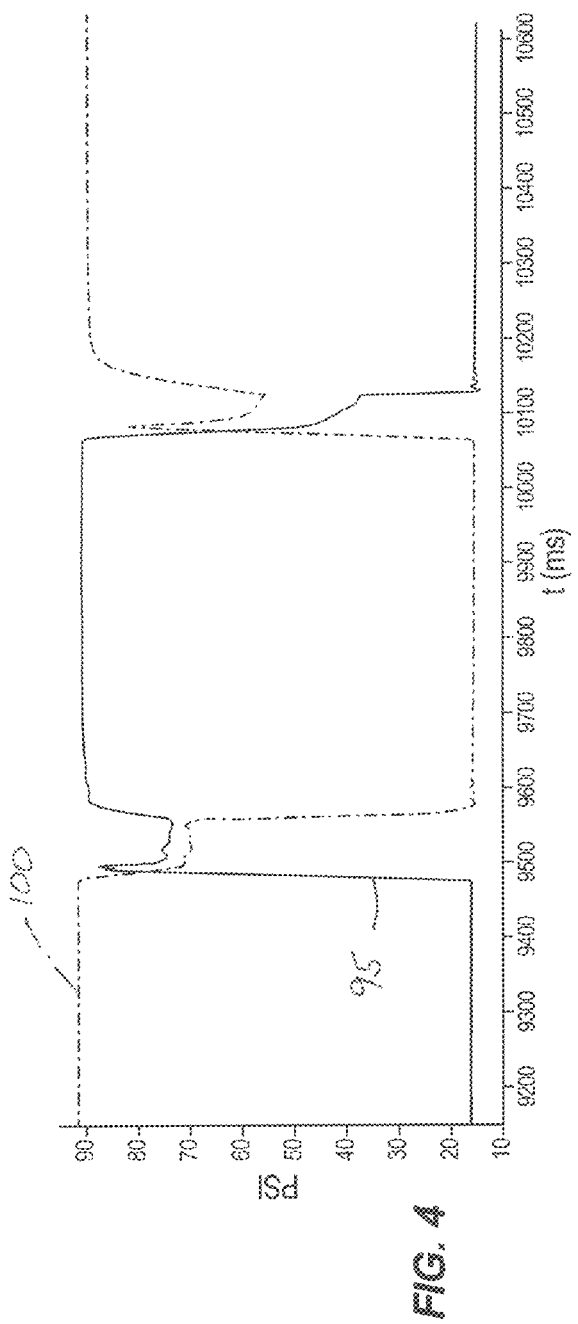
FIG. 4 is a plot illustrating measured pressure values versus time for a new actuator in the horizontal position with no load but with damping.
Figure 5:
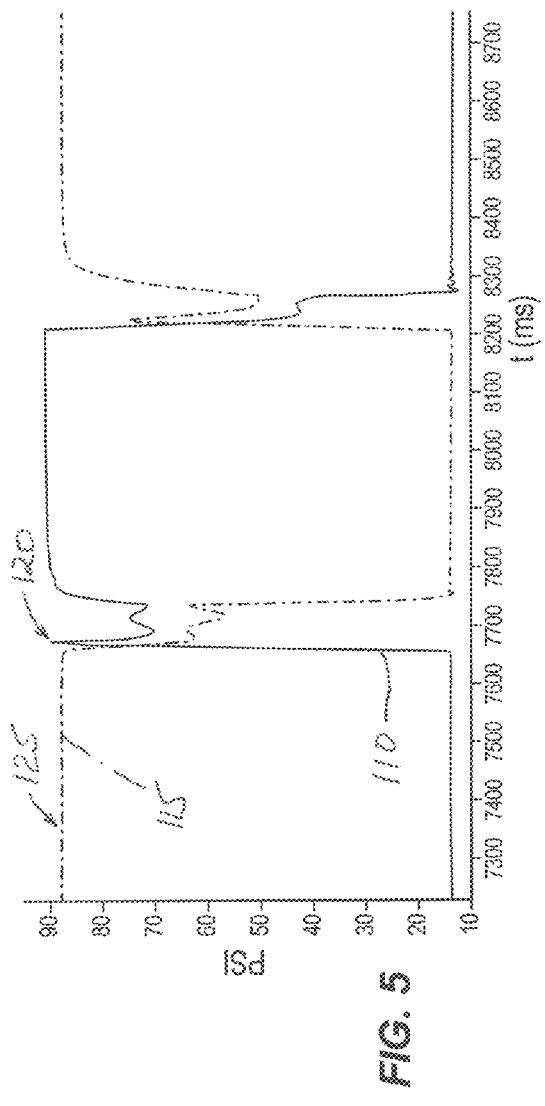
FIG. 5 is a plot illustrating measured pressure values versus time for a actuator in the same arrangement as that of FIG. 4, wherein the actuator is known to be damaged.

As noted, the loading and positioning of the actuator 15, along with many other factors, greatly affect the pressure data collected by the pressure sensors 20, 25. FIGS. 4 and 5 illustrate actuators 15 similar to the actuators 15 of FIGS. 2 and 3 respectively but with the addition of damping to slow the movement of the piston 40. Again, there are differences in the curves that are identifiable and that could be used to assess the condition of the actuators 15; however the curves are very different from those of FIGS. 2 and 3.

Figure 8:
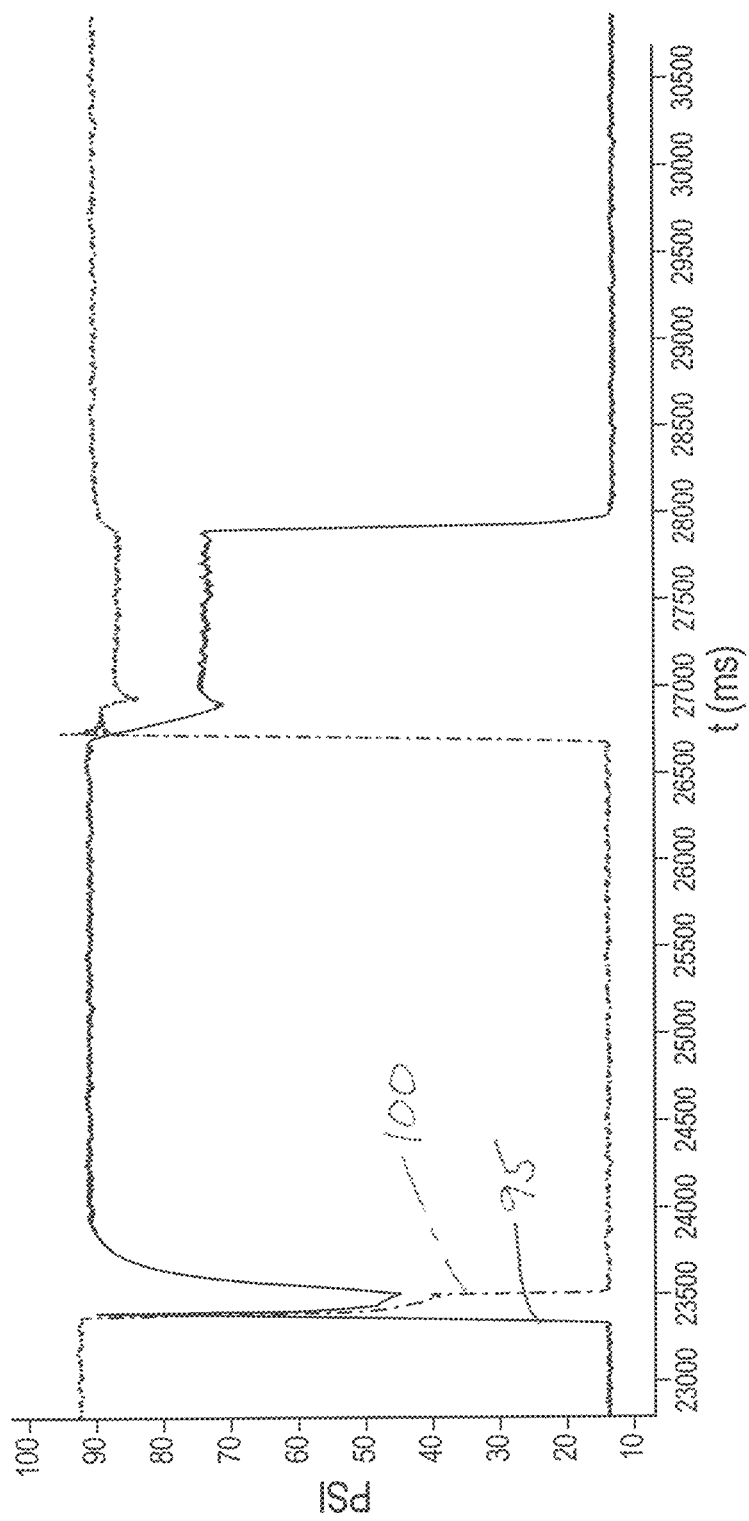
FIG. 8 is a plot illustrating measured pressure values versus time for a new actuator in the vertical position with a load and with damping.
Figure 9:
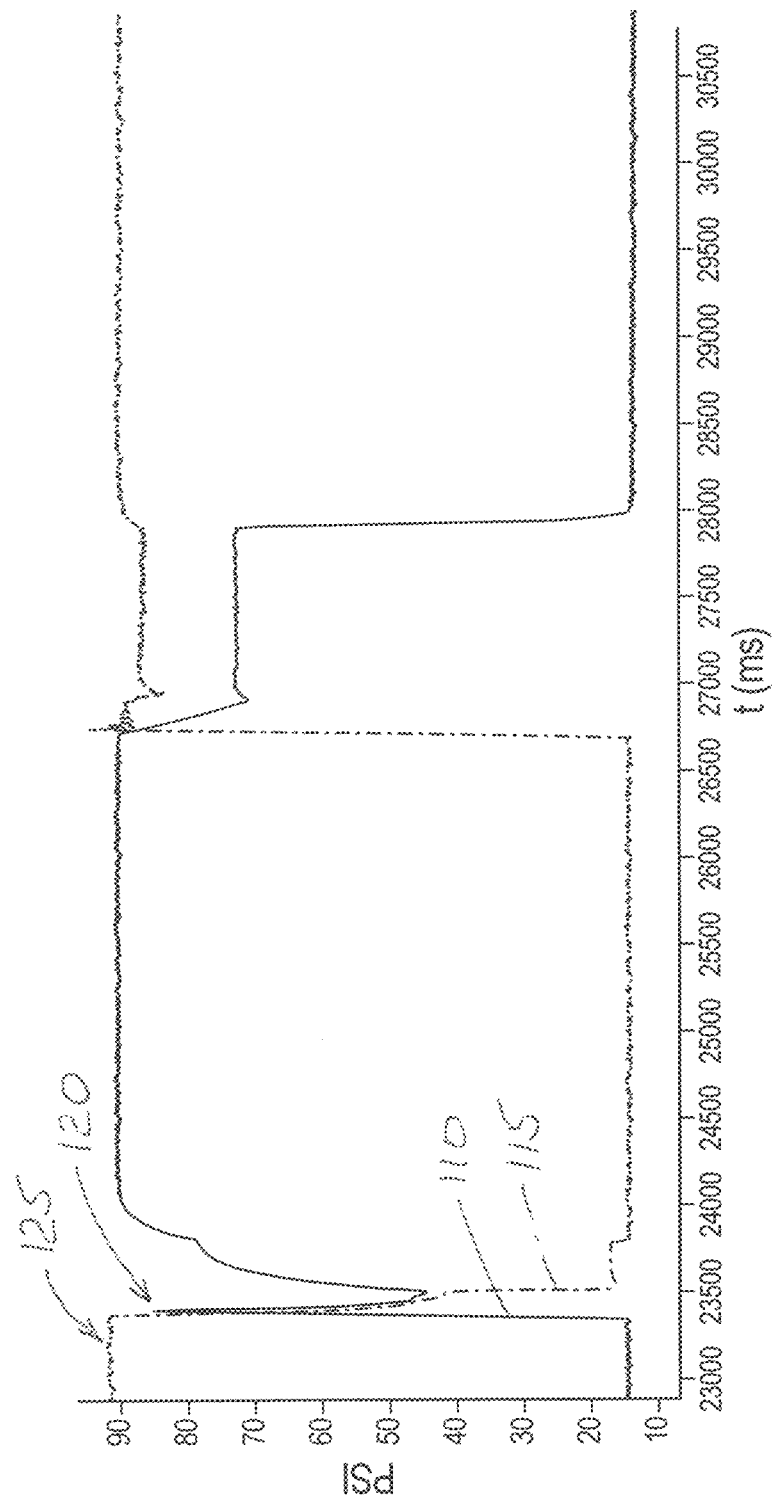
FIG. 9 is a plot illustrating measured pressure values versus time for a actuator in the same arrangement as that of FIG. 8, wherein the actuator is known to be damaged.

FIGS. 6 and 7 illustrate the same actuator 15 during horizontal operation with no load and no damping. The actuator 15 is a larger diameter than the actuator 15 used to produce FIGS. 2-5. FIG. 6 is data from a new actuator 15 with FIG. 7 illustrating data from an actuator 15 that is known to be damaged FIGS. 8 and 9 illustrate a vertically mounted actuator 15 with a load and with damping. FIG. 8 is data from a new actuator 15 with FIG. 9 illustrating data from an actuator that is known to be damaged.

In addition to measuring the pressure in the first chamber 50 and the second chamber 55, the system 10 is also capable of measuring the total time duration of the stroke and counting the total cycles or strokes of the piston 40. Both of these values can be used for maintenance cycle purposes or to evaluate the condition of the actuator 15. For example, the microprocessor/controller 30 could actuate a colored light to indicate that a predetermined number of cycles has occurred and routine maintenance should be performed or the actuator 15 should be replaced. The system 10 can also measure and monitor the maximum operating pressures and signal an alarm if one or more of the operating pressures are exceeded.

Other parameters could be monitored using the first sensor 20 and the second sensor 25 or additional sensors could be provided to monitor other parameters. For example, a temperature sensor could be coupled to the actuator 15 to monitor working fluid temperature, cylinder metal temperature, or any other temperature desired. The temperature data could be used to compensate for the effects of temperature on the operating pressure.

In addition to the monitoring functions described above, the system 10 can also be used to more directly control the operation of the actuator 15. For example, the microprocessor/controller 30 could provide control signals to the valve 70 or valves controlling the flow of fluid to the actuator 15 to control the speed at which the piston 40 moves or the total force generate by the piston 40. In addition, the present system 10 is capable of detecting the end of travel and stopping the piston 40 at that point or prior to that point if desired.

Another construction of a system 150 includes a position measurement system 155 that is capable of determining the actual position of the piston 40 within the cylinder 17. The cylinder 17 illustrated schematically in FIG. 10 is identical to that of FIG. 1 but includes the position measurement system 155. The position measurement system 155 includes a plurality of magnetic sensors 160 spaced along the length of the cylinder 17. Each sensor 160 is capable of accurately measuring the angle 165 between it and another magnet 170 such as a magnet 170 placed within or coupled to the piston 40. A signal indicative of the angle 165 is sent from each sensor 160 to the microprocessor/controller 30. The microprocessor/controller 30 uses the various angles to triangulate and calculate the precise position of the piston 40. This positional data can then be used to control the valves 70 to accurately control the position of the piston 40 at any time. This position information can also be used independently or in addition to other sensors for control and/or monitoring purposes.

The systems 10, 150 described herein can be used alone to monitor and control the operation of a single actuator 15. The system can signal when the condition of the actuator 15 changes significantly, can signal when maintenance is required and could signal when a replacement actuator 15 or seal is required. In addition, the system could be used to control the operation of the individual actuator 15.

Figure 11:
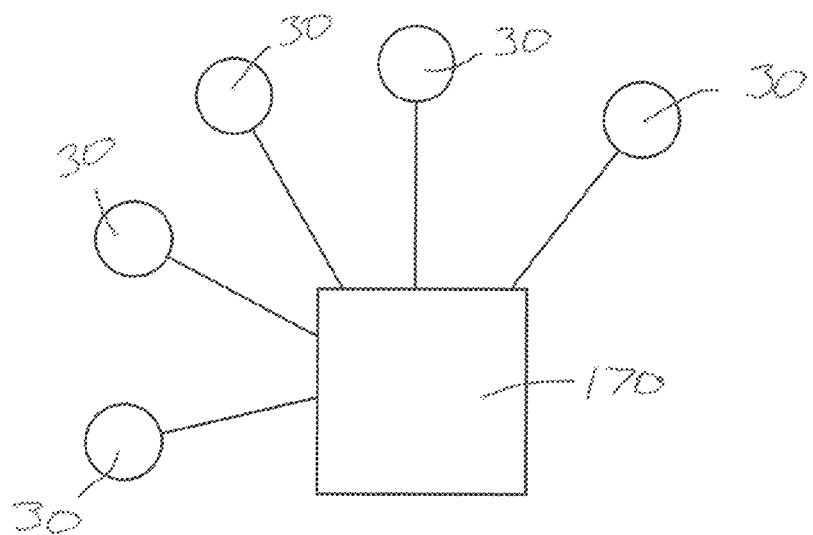
FIG. 11 is a schematic illustration of a multi-actuator system including a distributed control system.

In another arrangement, the various microprocessor/controllers 30 communicate with a central computer 170 as illustrated in FIG. 11. The central computer 170 is part of a distributed control system (DCS) that can monitor and control the individual actuators 15 from one location as may be required.

FIGS. 14-17 illustrate actual test results for a known actuators in good condition and the same actuator with three different known defects. FIGS. 14-17 illustrate one possible way in which the present system can be employed. Other types of actuators may have different failure modes and may therefore require slightly different analysis. In addition, the absolute pressures, times, and cycles discloses herein are exemplary and could vary depending on many factors including the application or actuator being used. However, FIGS. 14-17 are exemplary of one possible use for the system.

Figure 14:
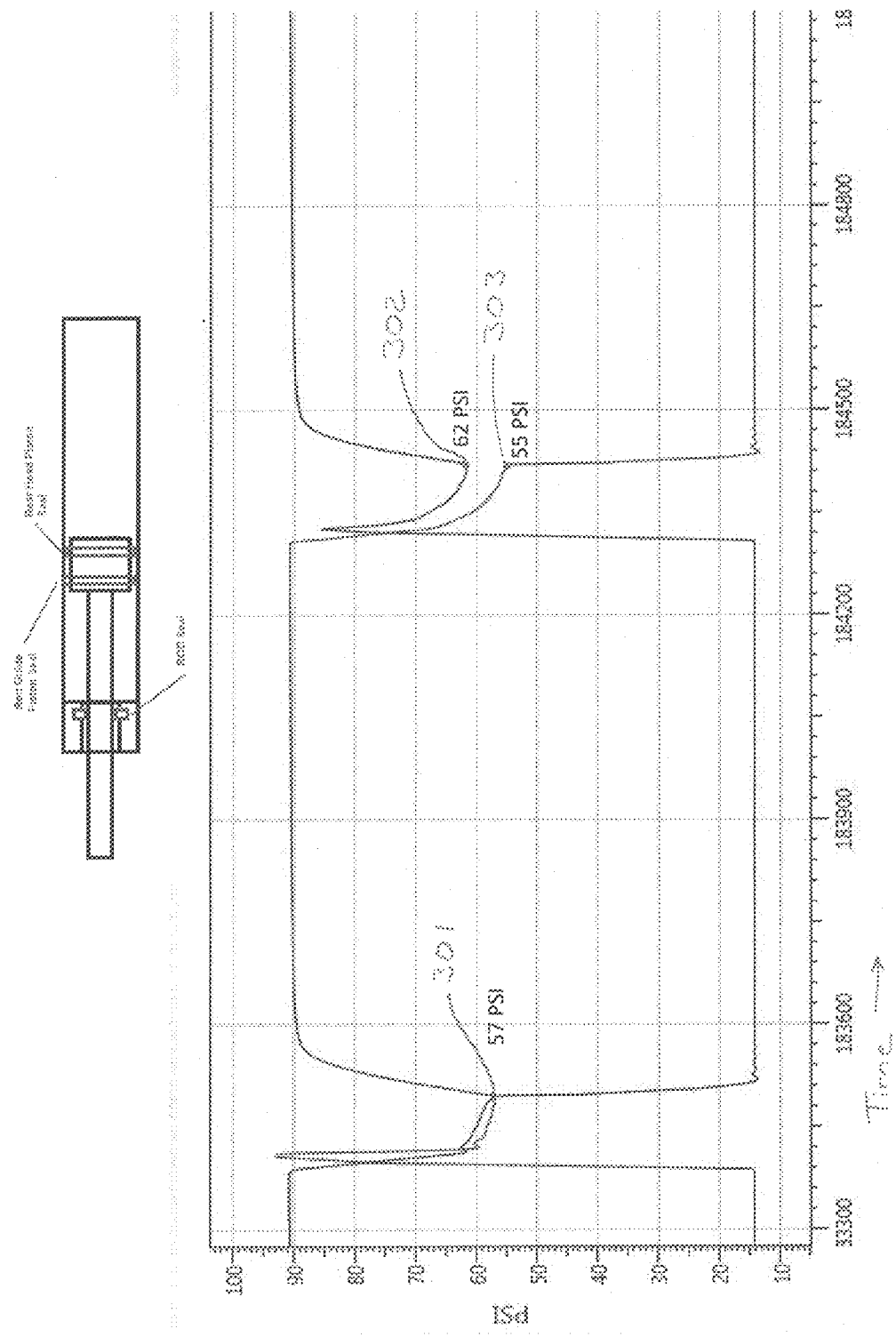
FIG. 14 is an image of baseline test results for a known actuator.

FIG. 14 illustrates a baseline measurement of a known actuator that is known to be in a good or acceptable condition. The actuator includes a shaft or rod seal a rod-side piston seal and a head piston seal positioned on the opposite side of the piston as the rod side seal. Any one of these seals can fail during use of the actuator and the present system is able to detect that failure before the actuator becomes unusable. As can be seen, the system generates waveforms (or curves) based on pressure measurements taken from both sides of the piston. As illustrated, three specific data points 301, 302, and 303 are identified. These three data points will be discussed with regard to the FIGS. 15-17 as these points move in response to particular failures. In addition, it should be noted that the maximum pressure of each side of the cylinder are substantially equal. This is typical of a good cylinder but is a function of any pressure or flow regulator that may be positioned upstream of the fluid ports. Additionally, the low pressure of each wave form is about equal to atmospheric pressure as is typical in a good actuator.

Figure 15:
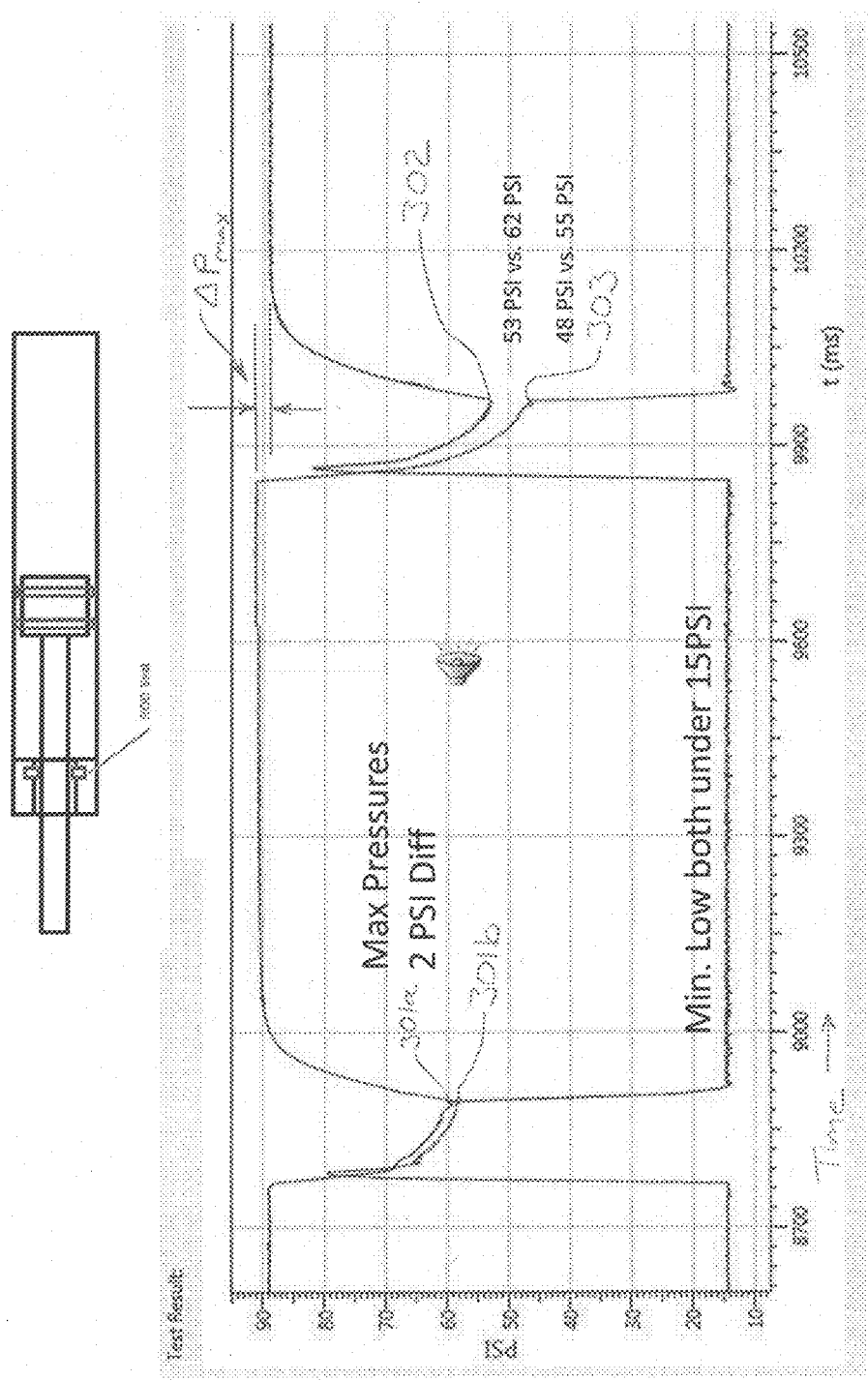
FIG. 15 is an image of test results for the known actuator of FIG. 14 with a defective shaft or rod seal.

FIG. 15 illustrates similar waveforms for an identical actuator of that of FIG. 14 but with a known defect. Specifically, the rod seal is known to be damaged. As can be seen, the two waveforms no longer intersect at the first data point 301. Rather, there is now a 2 psi difference between the two points 301a and 301b and they have shifted upward from the original 57 psi value. In addition, the second point 302 has shifted downward from 62 psi to 53 psi and the third point 303 has shifted downward from 55 psi to 48 psi. In addition, the maximum pressures of the two waveforms are different as a result of the defect. Any or all of these differences can be used to determine, not only that the actuator is operating abnormally but that the cause of the abnormal operation is likely a defective rod seal.

Figure 16:
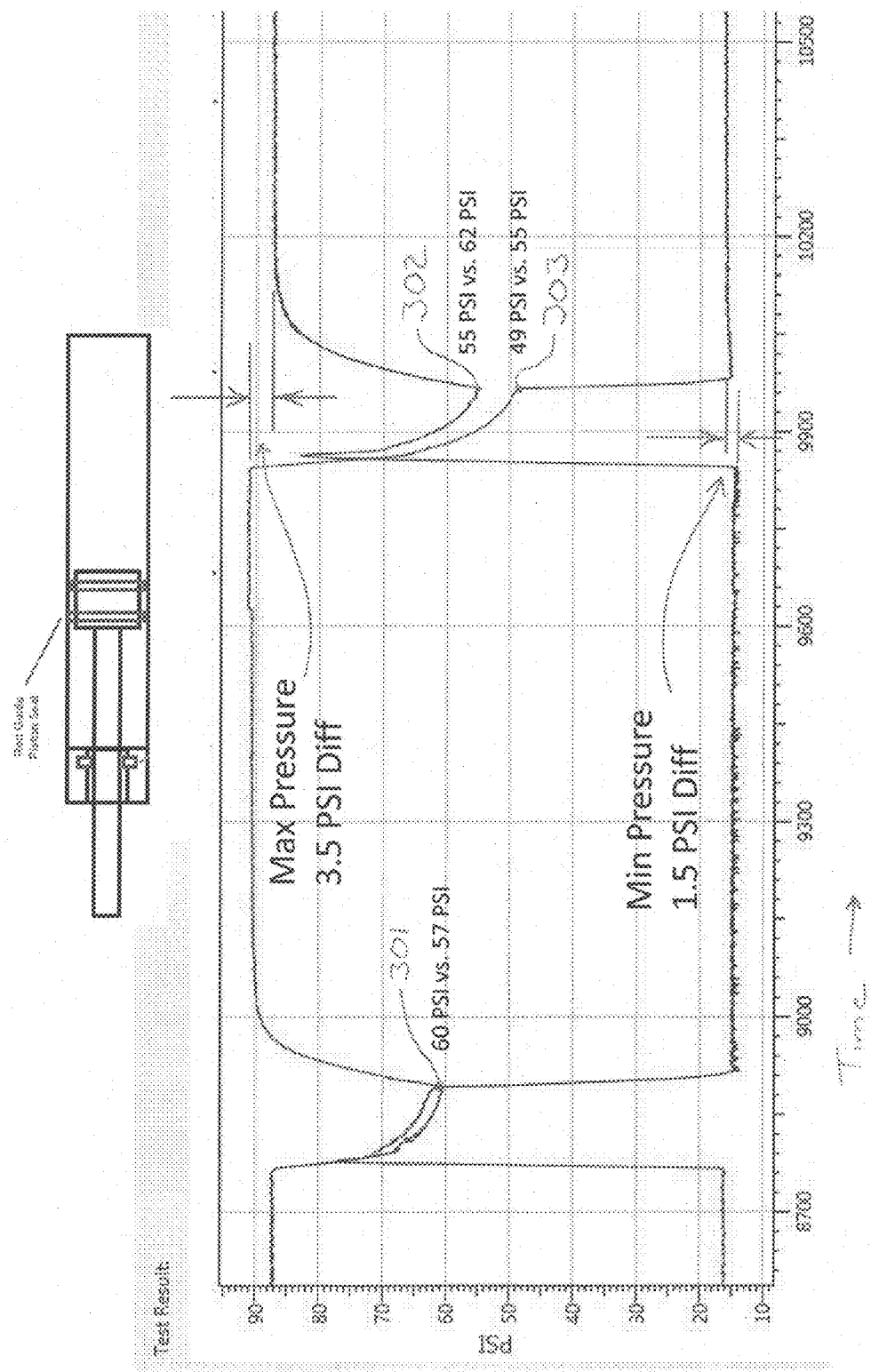
FIG. 16 is an image of test results for the known actuator of FIG. 14 with a defective rod-side piston seal.

FIG. 16 illustrates similar waveforms for an identical actuator of that of FIG. 14 but with a known defect. Specifically, the rod side piston seal is known to be damaged. As can be seen, the two waveforms now include many differences. For example, the first point 301 has shifted upward about 3 psi. In addition, the second point 302 has shifted downward from 62 psi to 55 psi and the third point 303 has shifted downward from 55 psi to 49 psi. These changes are similar to those discussed with regard to the waveforms of FIG. 15. However, the maximum pressure of the two waveforms now has a difference of about 3.5 psi. This is a larger difference than that seen as a result of the damaged rod seal. Furthermore, unlike with the damaged rod seal, the waveforms of FIG. 16 also show a pressure difference between the minimum pressures. Specifically, a difference of 1.5 psi is clearly visible. This difference was not present as a result of the defective rod seal. Thus, these differences can be used to determine, not only that the actuator is operating abnormally but that the cause of the abnormal operation is likely a defective rod side piston seal.

Figure 17:
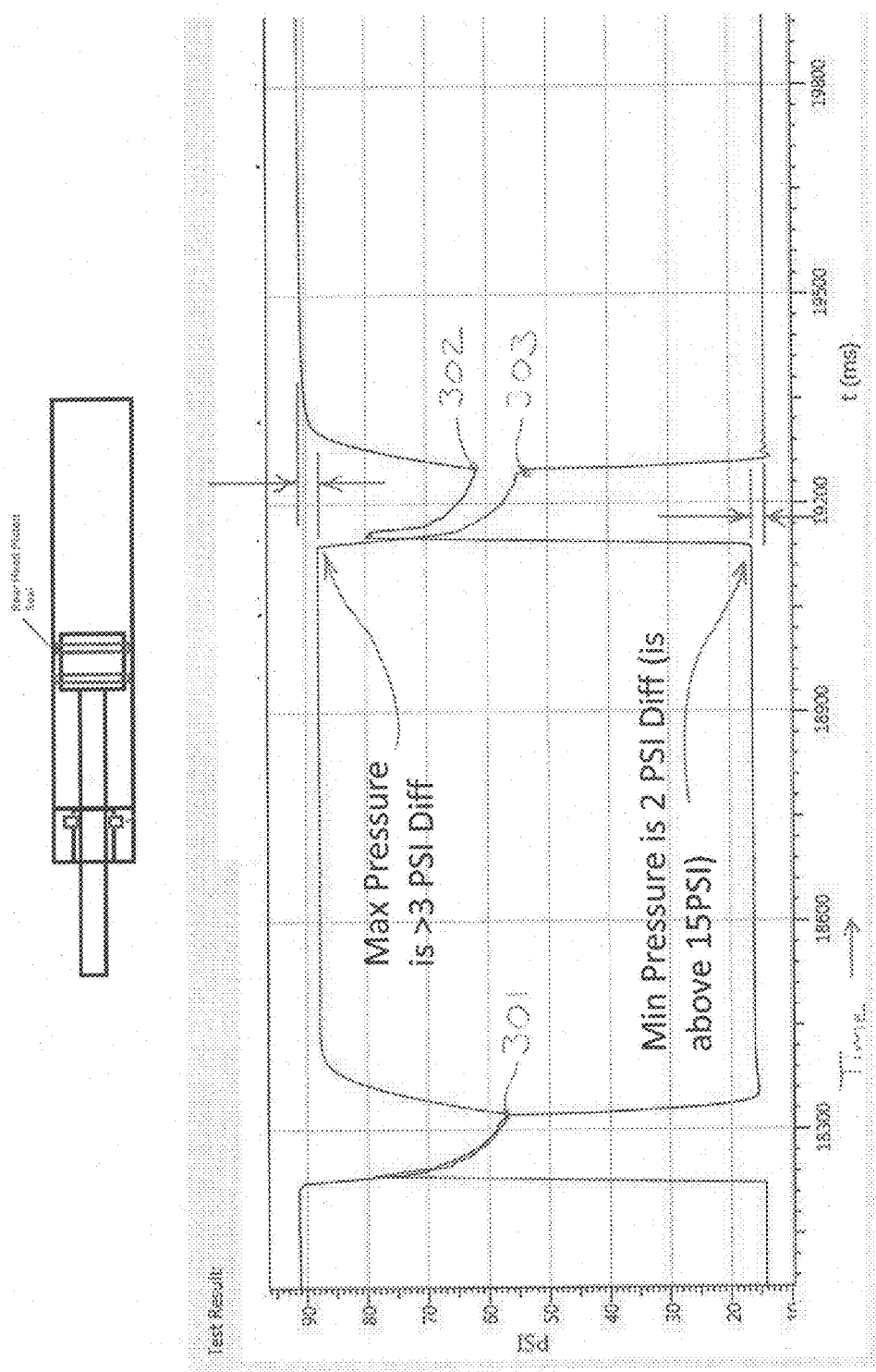
FIG. 17 is an image of test results for the known actuator of FIG. 14 with a defective rear head (opposite the rod) piston seal.

FIG. 17 illustrates similar waveforms for an identical actuator of that of FIG. 14 but with a known defect. Specifically, the head side piston seal is known to be damaged. As can be seen, the two waveforms now include many differences when compared to the waveforms of FIG. 14 as well as the waveforms of FIGS. 15 and 16. For example, the first point 301 has not shifted when compared to the waveforms of FIG. 14. This is different than what is seen in FIGS. 15 and 16. Similarly, the second point 302 and the third point 303 have remained largely unchanged when compared to the waveforms of FIG. 14. Thus, looking only at these three points, one would conclude that the actuator of FIG. 17 is in a good condition. However, the maximum pressure of the two waveforms now has a difference of greater than 3 psi. This difference is similar in magnitude to that of FIG. 16 but the direction is reversed (i.e., the opposite sensor is higher).

Furthermore, like the waveforms of FIG. 16, the waveforms of FIG. 17 show a pressure difference between the minimum pressures. Specifically, a difference of about 2 psi is clearly visible. Like the maximum pressure difference, this difference was present in the waveforms of FIG. 16, but again the direction is reversed (i.e., the opposite sensor is low). Thus, these differences can be used to determine, not only that the actuator is operating abnormally but that the cause of the abnormal operation is likely a defective head side piston seal.

It should be noted that the actuators used to generate the waveforms of FIGS. 14-17 were unloaded. As such, there was very little variation in the cycle times (the X-axis) as a result of the defects. However, in loaded cylinders, the defects discussed above also cause measurable variations in the cycle times. These variations can be measured and reported and can also be used to assess the status of the actuator. In addition to using time variations to determine if potential problems have occurred, some constructions utilize the area under the curve to assess if problems are occurring. More specifically, the area between the curves can be used in situations where the actuator is operated at varying pressures or at varying rates. In these situations, it has been found that the total area under the curve remains substantially uniform. Thus, an increase in this area is indicative of unwanted leakage or other performance failures. In other applications, variations in the area between the curves may be indicative of a particular failure mode alone or in combination with other measured parameters.

Furthermore, the start and the end of a cycle can be easily detected and reported for use in both controlling a process as well as accessing the condition of the actuator. In addition, if a cycle time is determined to be faster than necessary, or slower than necessary, the pressure can be adjusted to achieve the desired cycle time, thereby enhancing the quality of the process and possibly reducing the amount of air or compressed fluid used by the actuator.

Figure 12:
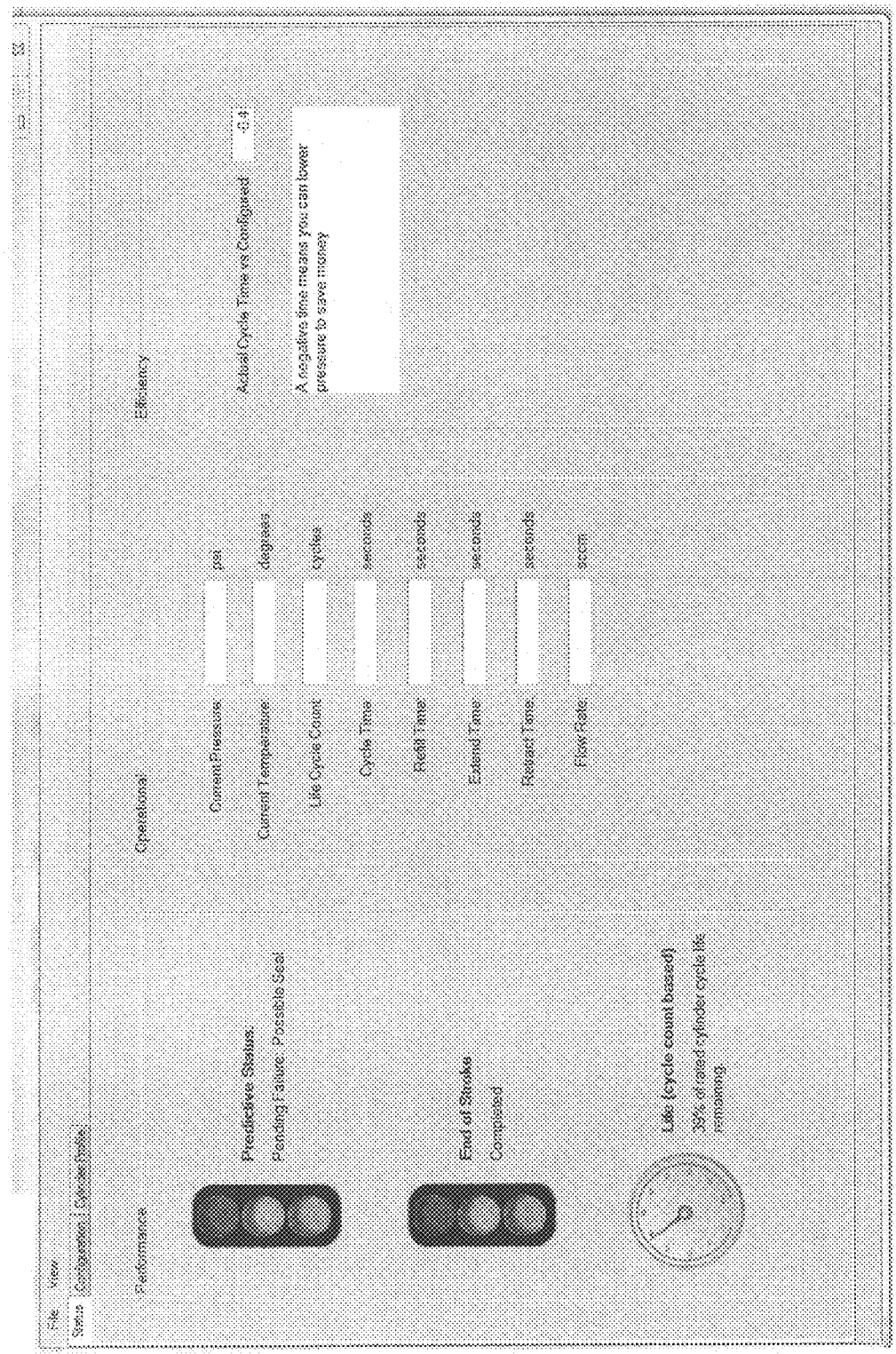
FIG. 12 is a screen image of a monitoring system for use in monitoring the performance and condition of one or more actuators.
Figure 13:
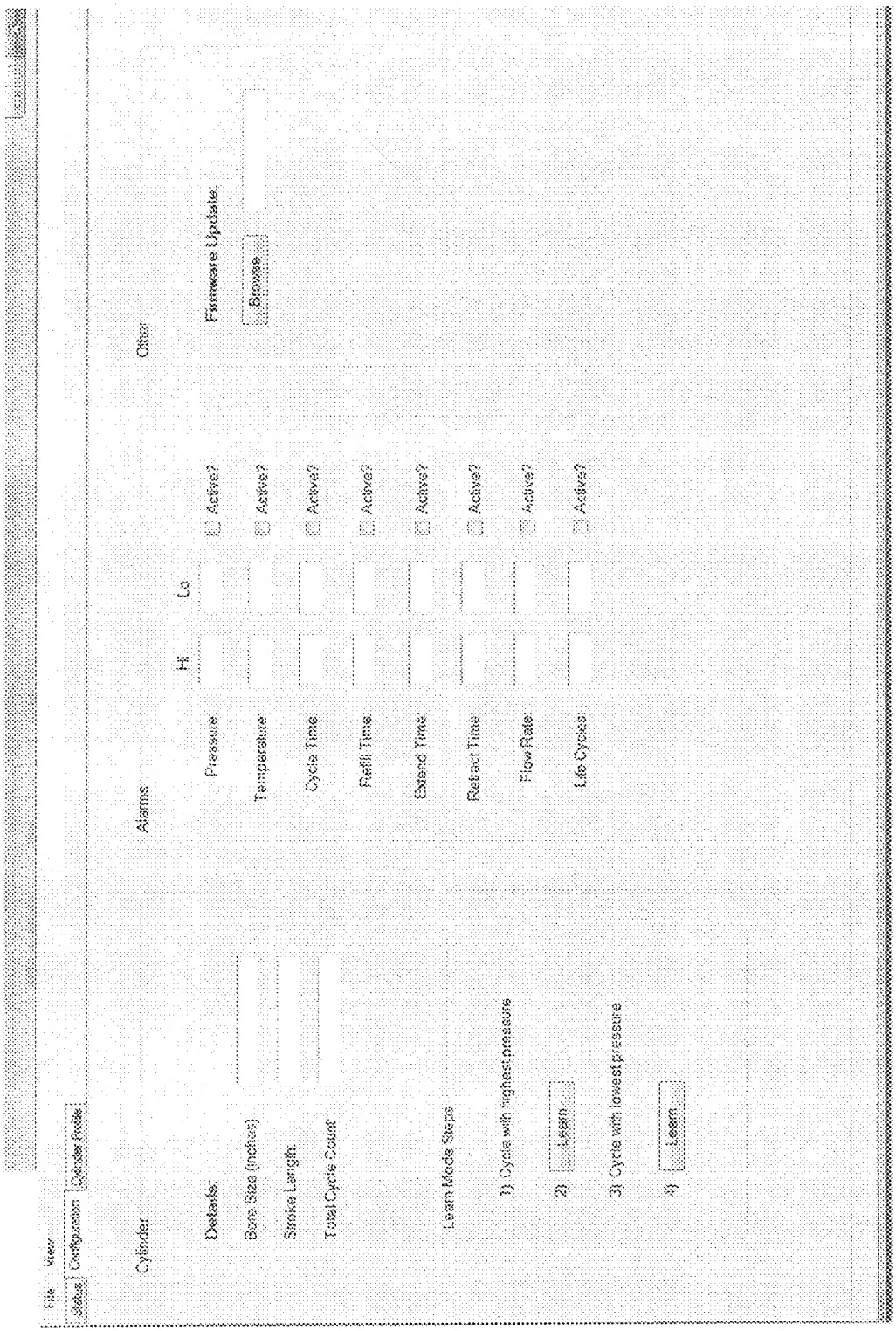
FIG. 13 is another screen image of the monitoring system of FIG. 12 for use in monitoring the performance and condition of one or more actuators.

FIGS. 12 and 13 illustrate images of one possible monitoring system for use with the systems discussed herein. FIG. 12 illustrates status page for the monitoring system. While the status page includes the status of one actuator, multiple actuators could be grouped together and illustrated as desired. The illustrated image includes three performance indicators with the first indicator providing a red, yellow or green status based on the waveform analysis discussed above. The second indicator provides an indication that the end of the stroke has been reached. The third indicator counts actuator cycles and provides an indication of actuator life based on the number of cycles. The life could be the actual useful life of the actuator or could be set to mirror recommended maintenance intervals for a particular sensor.

The second area of the status page provides numerical data for various operating parameters of the actuator. Other parameters could be measured and displayed as desired. The third area of the status page provides an efficiency analysis. In this example, the efficiency is based on cycle time. The data displayed is a comparison of the actual cycle time versus the desired cycle time with a space provided to provide recommended corrective action based on the result. In this example, the actuator is moving faster than desired. Thus, the pressure of the fluid could be lowered to slow the actuator and potentially reduce the cost of operation.

FIG. 13 illustrated one possible configuration page that provides data specific to the actuator being reviewed. In this example, the bore size, the stroke length, and the total cycle count can be added, stored, and displayed. In addition, the steps required to generate the baseline waveforms (FIG. 14) can be initiated from this page. Finally, alarm set points for any measured parameters can be set with each having a high alarm, a low alarm, and a selector to activate or deactivate the alarm. Finally, a Firmware update status is provided to alert the user when a firmware update is required.

It should be noted that the invention is described as being used with an actuator (sometimes referred to as a cylinder, a pneumatic cylinder, or a hydraulic cylinder). However, in other applications, the invention is applied to a valve or any other flow device. A flow device would be any device that controls the flow of a fluid or operates in response to a flow of fluid being directed thereto. As such, the invention should not be limited to actuators alone.

Thus, the invention provides a system 10, 150 for measuring and controlling the operation of an actuator 15. The system 10, 150 includes pressure sensors 20, 25 that are capable of collecting data and a microprocessor/controller 30 capable of analyzing the data to determine the condition of the actuator 15.

What is claimed is:

1. An actuator system comprising:
a piston-cylinder arrangement including a piston that is movable with respect to a cylinder;
a first flow path in fluid communication with the piston-cylinder arrangement;
a second flow path in fluid communication with the piston-cylinder arrangement;
a control system operable to fluidly connect the first flow path to a source of high-pressure fluid and to connect the second flow path to a drain to move the piston in a first direction;
a pressure sensor fluidly connected to the first flow path and operable to measure sufficient pressure data during the movement of the piston to generate a pressure versus time curve, the control system operable to compare the generated pressure versus time curve to a known standard pressure versus time curve stored in the control system to determine the condition of the piston-cylinder arrangement;
wherein the control system includes a microprocessor and a memory device, and wherein the known standard pressure versus time curve is generated for the piston-cylinder arrangement during one or more initial operating cycles and is stored in the memory device.

2. The actuator system of claim 1, wherein the cylinder defines an internal space and wherein the piston divides the internal space into a first side in fluid communication with the first flow path and a second side in fluid communication with the second flow path.

3. The actuator system of claim 1, further comprising a piston seal coupled to the piston to inhibit fluid flow between the piston and the cylinder, the control system operable to predict a failure of the piston seal based on the comparison of the generated pressure versus time curve to the known standard pressure versus time curve stored in the control system.

4. The actuator system of claim 1, further comprising a shaft coupled to the piston and including a shaft seal that inhibits fluid flow between the shaft and the cylinder, the control system operable to predict a failure of the shaft seal based on the comparison of the generated pressure versus time curve to the known standard pressure versus time curve stored in the control system.

5. The actuator system of claim 1, wherein the pressure sensor is operable to measure data at a rate of at least 1000 data points per second.

6. The actuator system of claim 1, wherein the pressure sensor is operable to measure pressure data with an accuracy of plus or minus 0.01 psi.

7. The actuator system of claim 1, wherein the piston-cylinder arrangement is a pneumatic piston-cylinder arrangement.

8. An actuator system comprising:
a cylinder defining an internal space and including a first fluid port disposed adjacent a first end of the space and a second fluid port adjacent the second end of the space;
a piston disposed within the internal space and operable to divide the space into a first side and a second side, the first side in fluid communication with the first fluid port and the second side in fluid communication with the second fluid port;
a working member coupled to the piston and operable to perform work in response to movement of the piston;
a control system operable to selectively fluidly connect the first fluid port to one of a pressure source and a drain and to connect the second fluid port to the other of the drain and the pressure source to selectively move the piston away from the first port and toward the first port; and a pressure sensor in fluid communication with the first side and operable to measure pressure data during movement of the piston, the control system being operable to compare the measured pressure data to a known standard to determine the condition of the system;

wherein the control system includes a microprocessor and a memory device, and wherein the known standard is generated during one or more initial operating cycles and is stored in the memory device.

9. The actuator system of claim 8, wherein the measured pressure data is compiled into a generated pressure versus time curve and the known standard includes a known standard pressure versus time curve that is stored in the control system.

10. The actuator system of claim 8, further comprising a piston seal coupled to the piston to inhibit fluid flow between the piston and the cylinder, the control system operable to predict a failure of the piston seal based on the comparison of the measured pressure data to the known standard.

11. The actuator system of claim 8, wherein the working member includes a shaft that extends through the cylinder and a shaft seal that inhibits fluid flow between the shaft and the cylinder, the control system operable to predict a failure of the shaft seal based on the comparison of the measured pressure data to the known standard.

12. The actuator system of claim 8, wherein the pressure sensor is operable to measure data at a rate of at least 1000 data points per second.

13. The actuator system of claim 8, wherein the pressure sensor is operable to measure pressure data with an accuracy of plus or minus 0.01 psi.

14. The actuator system of claim 8, wherein the piston and cylinder define a pneumatic piston-cylinder arrangement.

15. The actuator system of claim 8, further comprising a second pressure sensor in fluid communication with the second side and operable to measure a second set of pressure data during movement of the piston, the control system being operable to compare the second set of measured pressure data to a second known standard to determine the condition of the system.

16. A method of predicting a failure in an actuator system, the method comprising:

porting a high-pressure fluid to a first side of a piston-cylinder arrangement;

draining a low-pressure fluid from a second side of the piston-cylinder arrangement to allow the piston to move with respect to the cylinder toward the second side;

taking a plurality of pressure measurements of the fluid adjacent the first side during the movement of the piston;

generating a known set of pressure values during one or more initial operating cycles of the actuator system and storing the known set of pressure values in a control system;

comparing the plurality of pressure measurements to the known set of pressure values; and determining if a failure is likely based on the comparison of the plurality of pressure measurements to the known set of pressure values.

17. The method of claim 16, further comprising taking the plurality of pressure measurements at a frequency of at least 1000 data points per second.

* * * * *